United States Patent
Ren et al.

(10) Patent No.: US 9,762,533 B2
(45) Date of Patent: Sep. 12, 2017

(54) METHOD OF IMS (SIP NETWORK) WEBRTC OPTIMIZED P2P COMMUNICATION

(71) Applicant: Futurewei Technologies Inc., Plano, TX (US)

(72) Inventors: Huipeng Ren, Santa Clara, CA (US); Yilin Gan, San Ramon, CA (US); Xinmin Ding, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/137,216

(22) Filed: Dec. 20, 2013

(65) Prior Publication Data

US 2015/0180825 A1     Jun. 25, 2015

(51) Int. Cl.
G06F 15/16     (2006.01)
H04L 29/12     (2006.01)
H04L 29/08     (2006.01)
H04L 29/06     (2006.01)

(52) U.S. Cl.
CPC ...... *H04L 61/2564* (2013.01); *H04L 65/1006* (2013.01); *H04L 65/1033* (2013.01); *H04L 65/1069* (2013.01); *H04L 67/02* (2013.01); *H04L 67/2823* (2013.01); *H04L 61/2575* (2013.01); *H04L 61/2589* (2013.01); *H04L 65/1016* (2013.01); *H04L 67/104* (2013.01)

(58) Field of Classification Search
CPC ............. H04L 65/1016; H04L 65/1006; H04L 61/2564; H04L 29/125; H04L 69/24; H04L 65/607; H04L 65/608; H04L 67/141; H04L 47/801; H04W 80/10; G06F 12/1408
USPC ........................................................ 370/252
See application file for complete search history.

(56) References Cited

U.S. PATENT DOCUMENTS

| | | | |
|---|---|---|---|
| 7,760,744 B1 * | 7/2010 | Mohaban .............. | H04L 63/029 370/389 |
| 7,881,294 B1 * | 2/2011 | Croak ................. | H04M 7/1295 370/392 |
| 8,024,560 B1 * | 9/2011 | Alten .................. | H04L 63/0428 713/156 |
| 2003/0149775 A1 * | 8/2003 | O'Neill ................... | H04L 29/06 709/227 |
| 2004/0032862 A1 * | 2/2004 | Schoeneberger ... | H04L 41/5064 370/352 |
| 2009/0129388 A1 * | 5/2009 | Akhtar .................... | H03M 7/30 370/392 |

(Continued)

*Primary Examiner* — Tauqir Hussain
*Assistant Examiner* — Kamran Mohammadi
(74) *Attorney, Agent, or Firm* — Schwegman Lundberg & Woessner, P.A.

(57) ABSTRACT

A WebRTC system, device and method enabling a P2P communication when both ends of a communication are WebRTC enabled devices. The system and devices also enable a WebRTC client to SIP device communication. A SIP interworking function is configured to receive a SDP1 from an originating WebRTC and obtain local media information from a media interworking function. The first SIP interworking function is configured to create a SDP2 based on the SDP1 and the local media information, create a SIP message comprising a message-body field including the SDP2 and an SIP extension header field including the SDP1, and send the SIP message to an IMS or SIP server.

32 Claims, 5 Drawing Sheets

(56) References Cited

U.S. PATENT DOCUMENTS

| | | | |
|---|---|---|---|
| 2009/0168778 A1* | 7/2009 | Ahmed | H04L 67/2814 370/392 |
| 2010/0124217 A1* | 5/2010 | Suzuki | H04M 7/0072 370/352 |
| 2010/0257582 A1* | 10/2010 | Castellanos Zamora | H04L 47/724 726/1 |
| 2012/0089693 A1* | 4/2012 | Lu | H04L 69/24 709/206 |
| 2013/0205033 A1* | 8/2013 | Peter | H04L 65/1046 709/228 |
| 2014/0222963 A1* | 8/2014 | Gangadharan | H04L 65/1016 709/219 |
| 2015/0002614 A1* | 1/2015 | Zino | H04N 7/148 348/14.08 |
| 2015/0127709 A1* | 5/2015 | Pai | H04L 65/1006 709/202 |

* cited by examiner

METHOD OF IMS (SIP NETWORK) WEBRTC OPTIMIZED P2P COMMUNICATION

TECHNICAL FIELD

The present invention is generally directed to WebRTC clients communicating with IP Multimedia System (IMS) or Session Initiation Protocol (SIP) networks, and more particularly to enabling WebRTC client's peer-to-peer (P2P) communications through an IMS or SIP network.

BACKGROUND

WebRTC mandates that terminals in a WebRTC network support the Secure Real-time Transport Protocol (SRTP) and the Interactive Connectivity Establishment (ICE) framework in order to communicate. The mode of SRTP can be the Datagram Transport Layer Security (DTLS) protocol. If one of the participant devices does not support it the communication will fail.

For existing software IP (SIP) devices, whether SIP Devices in Enterprises or SIP Devices in Service Providers (IP Multimedia Subsystem (IMS) based or non-IMS based):

Most of them do not support ICE;

Most of them do not support SRTP. Although some support SRTP, most legacy ones support Session Description Protocol Security Descriptions (SDES), not the DTLS-SRTP; and 3GPP Standard (3GPP.33.328) chose SDES mode for SRTP.

If a WebRTC device wants to inter-connect with an IMS or a SIP network, it has to use a WebRTC-SIP Interworking Function, which consists of a Web Server, a SIP Interworking Function, and a Media Interworking Function, Besides the translation between HTTP and SIP signaling, this WebRTC-SIP Interworking Function needs to convert between SRTP and Real-time Transport Protocol (RTP) as well as ICE termination.

The introduction of WebRTC-SIP Interworking Function introduces another issue: When both ends of a communication are WebRTC enabled devices the media path still relays from the Media Interworking Function while WebRTC was designed for P2P purposes.

There is desired a solution to allow media to perform P2P communication when both ends are WebRTC enabled devices in an IMS or SIP network.

SUMMARY

The present disclosure achieves technical advantages as a WebRTC system, device and method enabling a P2P communication when both ends of a communication are WebRTC enabled devices. The system and devices also enable a WebRTC client to SIP device communication. A SIP interworking function is configured to receive a SDP1 from an originating WebRTC and obtain local media information from a media interworking function. The first SIP interworking function is configured to create a SDP2 based on the SDP1 and the local media information of the media interworking function, and create a SIP message comprising a message body field including the SDP2 and an SIP extension header field including the SDP1, and send the SIP message to an IMS or SIP server.

In one embodiment, there is provided a method of establishing a communication between two WebRTC browsers in a WebRTC network. The method includes receiving, by a Session Initiation Protocol (SIP) interworking function from an originating WebRTC browser, an original caller Session Description Protocol (SDP) which supports a Secure Real-time Transport Protocol (SRTP) and an Interactive Connectivity Establishment (ICE); obtaining, by the SIP interworking function, local media information from a media interworking function; and creating, by the SIP interworking function, a converted caller SDP which does not support the SRTP and the ICE based on the original caller SDP and the local media information from the media interworking function, creating an SIP message comprising the converted caller SDP and the original caller SDP, and sending the SIP message to a receiving WebRTC browser via an IP Multimedia System (IMS) or SIP server.

In another embodiment, there is provided a network apparatus for establishing a communication between two clients in a communication network. The network apparatus includes a memory and a processor coupled to the memory, wherein the memory includes instructions that when executed by the processor causes the network apparatus to: receive, from an originating WebRTC browser, an original caller Session Description Protocol (SDP) including a SDP information of the originating WebRTC browser, obtain local media information from a media interworking function, create a converted caller SDP based on the original caller SDP and the local media information from the media interworking function, create an SIP message comprising the converted caller SDP and the original caller SDP, and send the SIP message to a receiving client via an IP Multimedia System (IMS) or SIP server.

In yet another embodiment, there is provided a communication system for establishing a communication in a WebRTC network. The communication system includes an originating Session Initiation Protocol (SIP) interworking network apparatus and a terminating SIP interworking network apparatus. The originating SIP interworking network apparatus is configured to: receive an original caller Session Description Protocol (SDP) including a SDP information from an originating WebRTC browser, obtain local media information from a media interworking function, create a converted caller SDP based on the original caller SDP and the local media information from the media interworking function, create an SIP message comprising the converted caller SDP and the original caller SDP, and send the SIP message to the terminating SIP interworking network apparatus. The terminating SIP interworking network apparatus is configured to: receive the SIP message, retrieve the original caller SDP and send the original caller SDP to a receiving WebRTC browser via a Web server.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

This disclosure includes at least 2 embodiments. A first embodiment is illustrated with respect to a first network diagram shown in FIG. 1, with the message flow diagram shown in FIG. 2. A second embodiment is illustrated with respect to a second network diagram shown in FIG. 3, with the message flow diagram shown in FIG. 4.

Workflow 1

Figure 1:
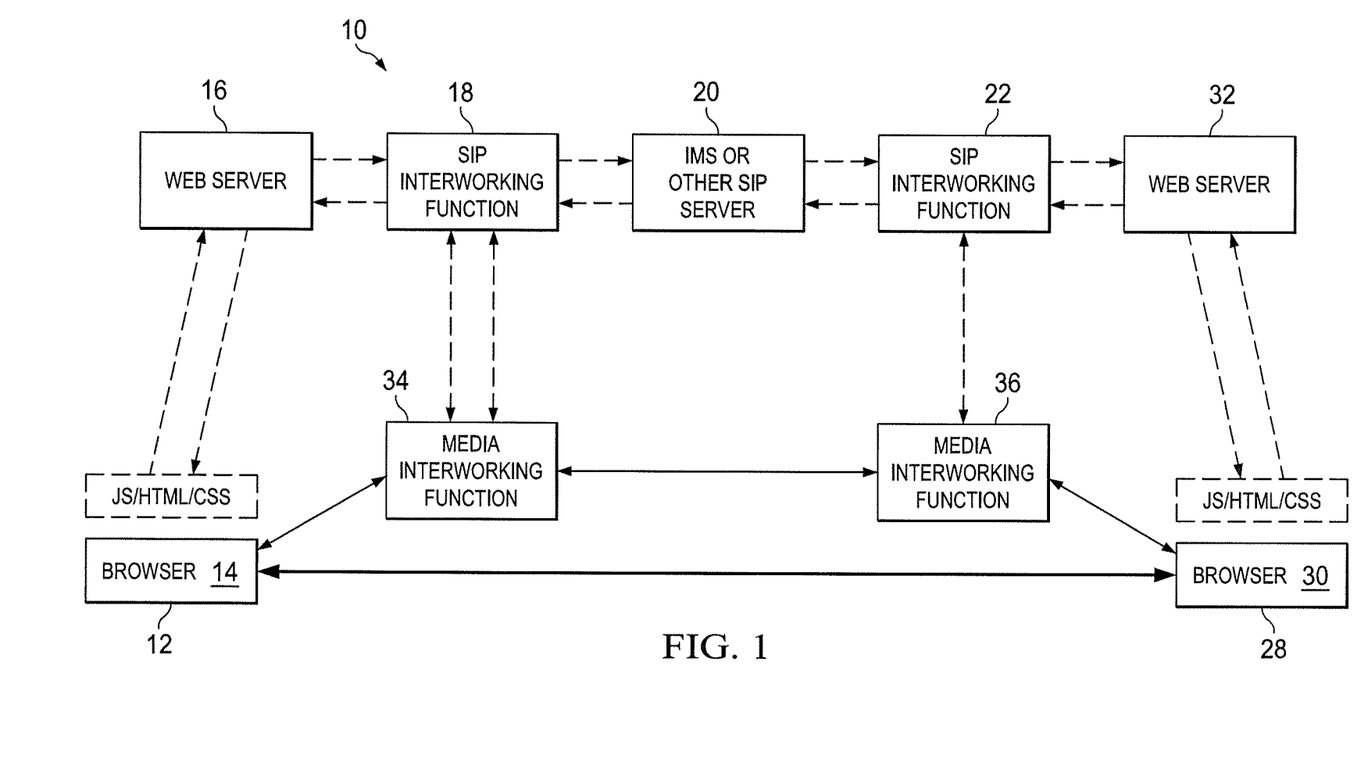
FIG. 1 illustrates a block diagram of WebRTC clients communicating with an IMS or SIP network configuration establishing a P2P communication between WebRTC clients.
Figure 2:
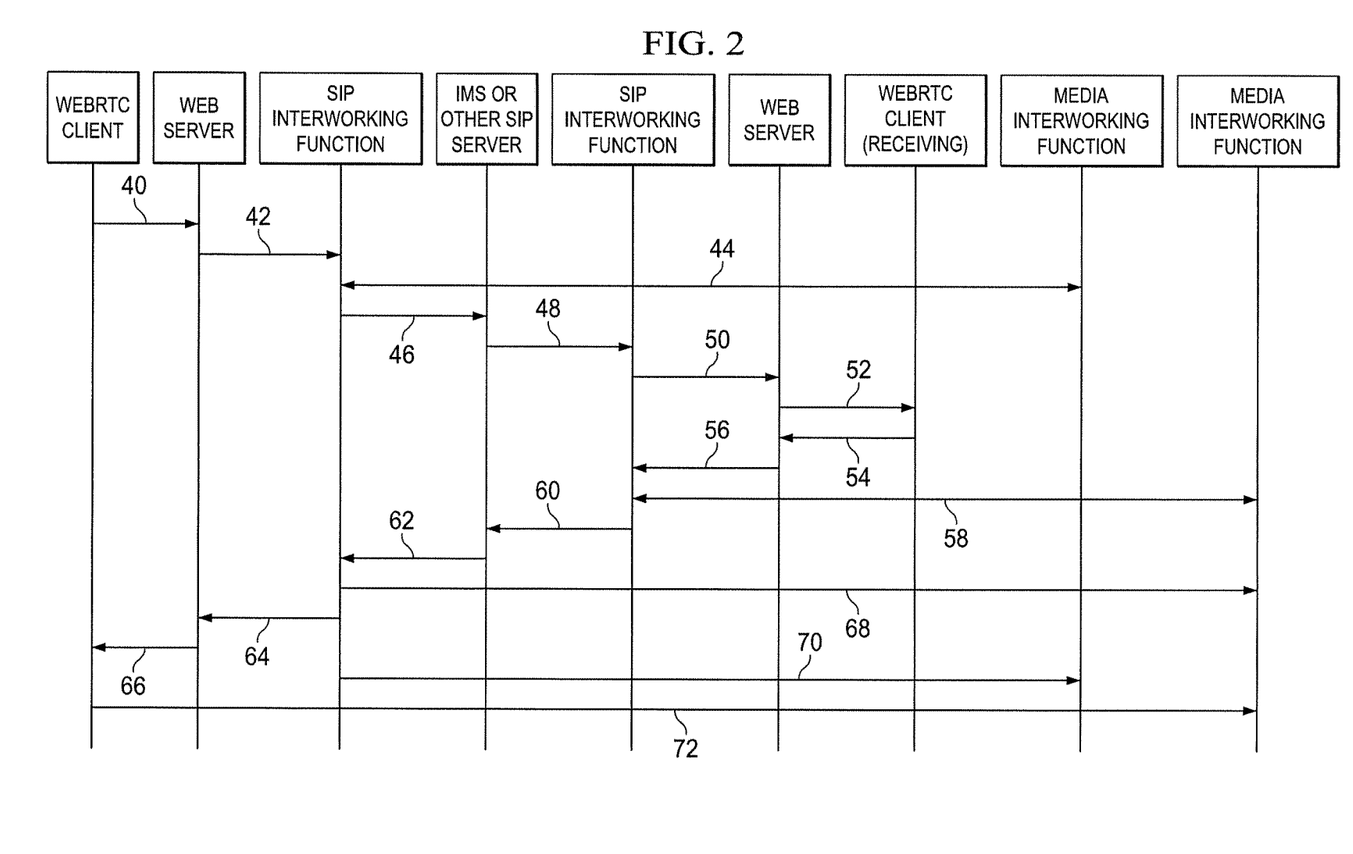
FIG. 2 illustrates a message flow diagram establishing the P2P communication between WebRTC clients through the IMS or SIP network.

Workflow 1 illustrates call processing to establish a P2P call between WebRTC clients 12 and 28.

Referring to FIG. 1 there is shown an IMS or SIP network at 10 seen to include a first WebRTC client 12 having a browser 14 and supported by a web server 16. A first SIP Interworking Function 18 is configured to communicate with an IMS or Other SIP Server 20, which in turn is configured to communicate with a second SIP Interworking Function 22. The second SIP Interworking function 22 is configured to communicate with a second WebRTC client 28 having a respective browser 30 via a web server 32. A pair of Media Interworking Functions 34 and 36 are configured to exchange media communications between the first WebRTC client browser 14 and the second WebRTC client browser 30.

Referring to FIG. 2 in view of FIG. 1, at step 40, WebRTC client browser 14 initiates a call with web server 16, creating a Session Description Protocol (SDP) with SRTP and ICE description for example labeled as an original caller Session Description Protocol or SDP1 and sending it to web server 16 by HTTP or a WebSocket connection.

At step 42, web server 16 passes SDP1 to SIP Interworking Function 18.

At step 44, the SIP Interworking Function 18 on the originating side of the call sends media information of SDP1 to Media Interworking Function 34, and obtains local media information of Media Interworking Function 34. The SIP Interworking Function 18 then creates a converted caller Session Description Protocol (for example labeled as SDP2) with RTP and without ICE description based on the original caller SDP1 and the local media information of Media Interworking Function. The SIP Interworking Function 18 then embeds the newly created SDP2 into the message-body field of a SIP request message (typically INVITE message). In the meantime, the SIP Interworking Function 18 embeds the SDP1 into a SIP extension header field, for example, X-WebRTC-SDP. Then, the SIP Interworking Function 18 sends the SIP request message including SDP2 and the embedded SDP1 to the IMS or Other SIP server 20 at step 46.

At step 48, when the IMS or SIP Server 20 receives the SIP request message it just ignores this X-WebRTC-SDP header because it does not recognize this extension header, and instead uses SDP2 for further processing. The X-WebRTC-SDP header is passed through.

At step 50, the SIP Interworking Function 22 on the terminating side receives and processes the SIP request message from the IMS or SIP Server 20. The SIP Interworking Function 22 detects that the SIP request message contains the X-WebRTC-SDP header and then retrieves the SDP1 from the X-WebRTC-SDP header.

At step 52, the SIP Interworking Function 22 sends the SDP1 via web server 32 to the receiving web browser 30 of WebRTC client 28. Because the SIP Interworking Function 22 knows that the WebRTC clients can make a P2P communication, it will not send any media information to the Media Interworking Function 36 or apply any media resources from the Media Interworking Function 36.

At step 54, the WebRTC client 28 uses SDP1 from the WebRTC client 12 to negotiate media information, and then creates and sends a callee original Session Description Protocol (for example labeled as SDP3) with SRTP and ICE description to web server 32.

At step 56, the web server passes SDP3 to the SIP Interworking Function 22.

At step 60, the SIP Interworking Function 22 on the terminating side creates a SIP response message (typically 1xx/2xx response) and embeds SDP3 into a X-WebRTC-SDP extension header field of this SIP response message. Because the WebRTC clients 12 and 28 can make a P2P communication, to avoid media stream interruption detection in the IMS or SIP Server 20, the SIP Interworking Function 22 creates a SDP answer with a HOLD state for SDP2, for example, labeled as converted callee Session Description Protocol or SDP4, and embeds SDP4 into the message-body field of the SIP response message (1xx/2xx) and sends it to IMS or SIP Server 20.

At step 62, when IMS or SIP Server 20 receives this SIP response message, it will ignore this X-WebRTC-SDP header of the SIP response message, and instead, it uses SDP4 for further processing. The X-WebRTC-SDP header including SDP3 is, however, passed through to SIP Interworking Function 18.

At step 64, the SIP Interworking Function 18 on the originating side receives the SIP response message, and detects that the SIP response message contains the X-WebRTC-SDP header, and retrieves the SDP3 from the X-WebRTC-SDP header. The SIP Interworking Function 18 sends SDP3 to web server 16, and at step 66 to the originating browser 14 of WebRTC client 12 via web server 16.

At step 70, the SIP Interworking Function 18 sends commands to the Media Interworking Function 34 to release the resource.

At step 72, the originating browser 14 of WebRTC client 12 uses SDP3 to negotiate media with the terminating browser 30 of WebRTC client 28 directly, and establish a P2P communication with browser 30 of terminating WebRTC client 28.

Workflow 2

Figure 3:
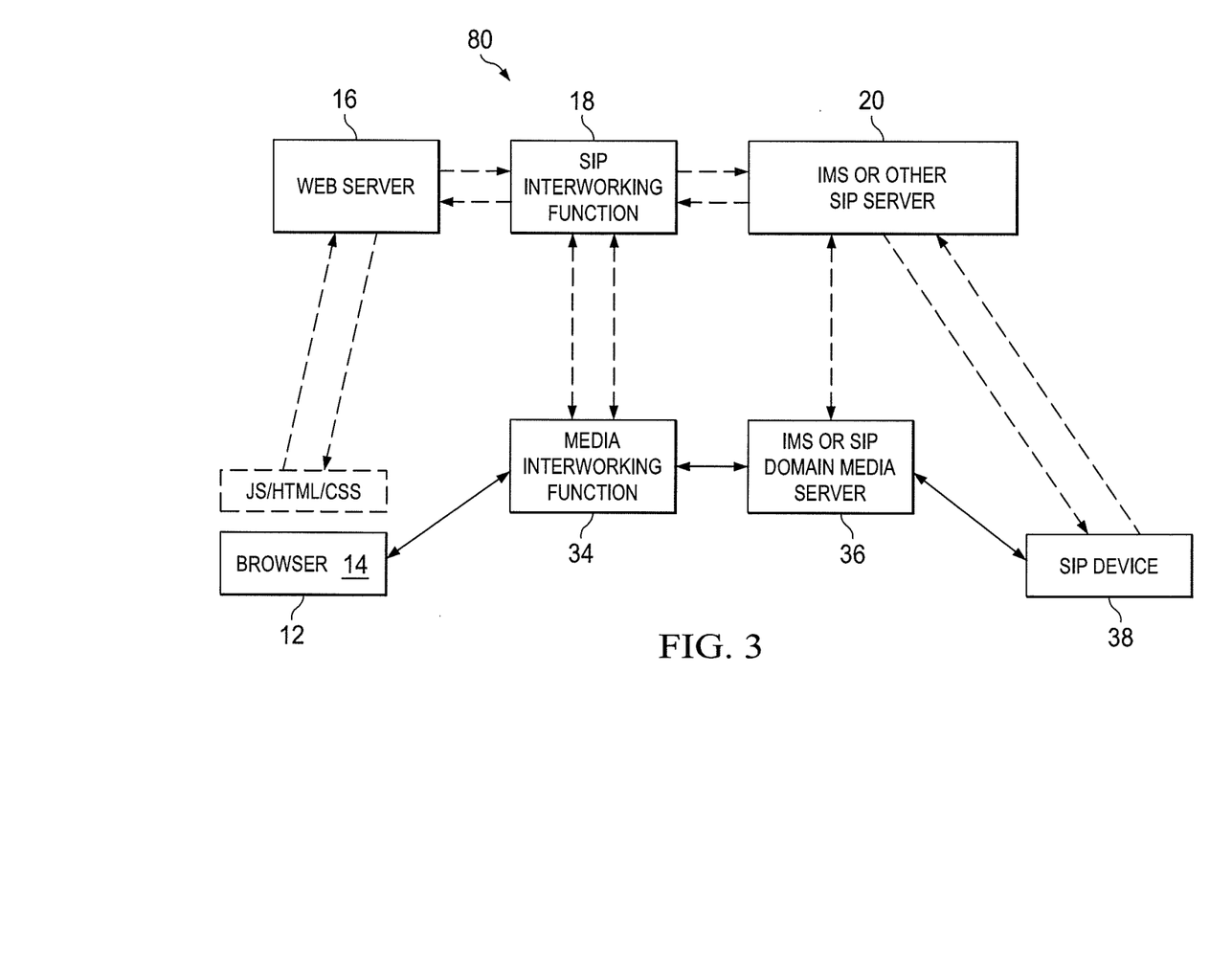
FIG. 3 illustrates a block diagram of WebRTC clients communicating with an IMS or SIP network configuration establishing a communication between a WebRTC client and a SIP device.

Workflow 2 illustrates call processing to establish a call between WebRTC client 12 and SIP device 39, wherein like numeral refer to like elements of FIG. 1.

Referring to FIG. 3 there is shown a IMS or SIP network at 80 seen to include first WebRTC client 12 having browser 14 and supported by web server 16. The SIP Interworking Function 18 is configured to communicate with IMS or Other SIP Server 20, which in turn is configured to communicate with a SIP device 38. Media Interworking Function 34 is configured to exchange media communications between browser 14 of the first WebRTC client 12 and SIP device 38 via an IMS or SIP domain media server 36.

Figure 4:
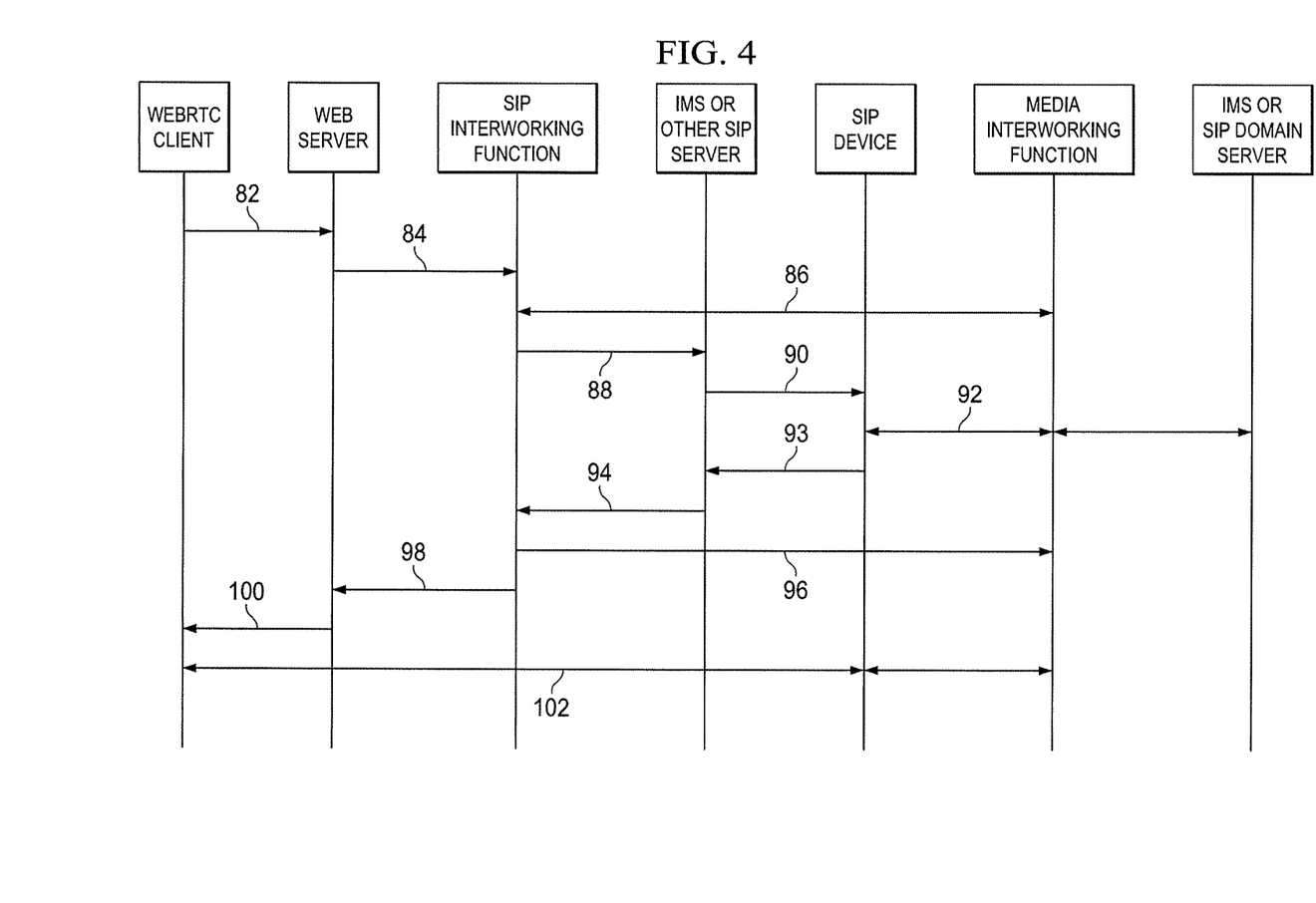
FIG. 4 illustrates a message flow diagram establishing the communication between a WebRTC client and a SIP device with reference to FIG. 3.

Referring to FIG. 4 in view of FIG. 3, at step 82 the browser 14 of the originating WebRTC client 12 initiates a call, creating an original caller Session Description Protocol (for example labeled as SDP1) with SRTP and ICE description and sending SDP1 to web server 16 by HTTP or a WebSocket connection.

At step 84, the web server 16 passes SDP1 to SIP Interworking Function 18.

At step 86, the SIP Interworking Function 18 on the originating side sends media information of SDP1 to Media Interworking Function 34, and obtains local media information of Media Interworking Function 34. The SIP Interworking Function 18 then creates a converted caller Session Description Protocol (for example labeled as SDP2) with RTP and without ICE description based on the SDP1 and the local media information of Media Interworking Function. The SIP Interworking Function 18 then embeds the newly created SDP2 into the message-body field of a SIP request message (typically INVITE message). In the meantime, the SIP Interworking Function 18 embeds the original SDP1 into a SIP extension header field, for example X-WebRTC-SDP, and then sends the SIP message including the SIP extension header to IMS or Other SIP server 20 at step 88.

At step 90, when the IMS or SIP Server 20 receives this SIP request message, it will ignore this X-WebRTC-SDP header because it does not recognize this extension header, and instead uses SDP2 for further processing. The X-WebRTC-SDP header including SDP1, however, is passed through to SIP device 38.

At step 92, SIP device 38 will not recognize the X-WebRTC-SDP header and will uses SDP2 to perform media negotiation with IMS or SIP domain media server 36 and at step 93 returns local media description (for example a callee original Session Description Protocol, labeled as SDP3) with RTP without ICE description to IMS or Other SIP Server 20.

At step 94, when IMS or Other SIP Server 20 receives the SIP response message from SIP device 38, it uses SDP3 for further processing, and sends the SIP response to the SIP Interworking Function 18.

At step 96, when the SIP Interworking Function 18 receives the SIP response message, it cannot find the X-WebRTC-SDP header, and will assume that the SIP device 38 does not support WebRTC, and responsively sends the media information of SDP3 to Media Interworking Function 34. SIP Interworking Function 18 then creates a converted callee Session Description Protocol (for example labeled as SDP4) with SRTP and ICE description based on SDP3 and the local media information of Media Interworking Function, and at step 98 sends SDP4 to web server 16.

At step 100, the web server 16 sends SDP4 to browser 14 of originating WebRTC client 12.

At step 102, browser 14 of the WebRTC client 12 uses this SDP4 to perform media negotiation with Media Interworking Function 34, and starts ICE connectivity check. The originating WebRTC client 12 and the SIP device 38 use Media Interworking Function 34 and IMS or SIP Domain Media Server 36 to connect the media.

Advantageously, by adding the SIP extension header (for example, X-WebRTC-SDP) including the WebRTC client 12 original SDP information, the WebRTC-SIP Interworking Function 18 enables the WebRTC client 12 to use the IMS or SIP Server 20 not only to connect with a SIP device 38, but also make a P2P communication directly with another WebRTC client 28.

An alternative solution comprises using the SIP multipart message bodies mechanism instead of using the SIP extension header, by adding the original SDP information of the WebRTC client 12 into the message-body field of a SIP message (multibody), the WebRTC-SIP Interworking Function 18 enables the WebRTC client 12 to use the IMS or Other SIP Server 20 to not only connect with the SIP device 38, but also make a P2P communication directly with another WebRTC client 28.

In a first example of implementing the X-WebRTC-SDP extension header (It can be used to Workflow 1 and Workflow 2), the WebRTC-SIP Interworking Functions compresses the original SDP string by a compression algorithm and encodes it by base 64 encoding:

X-WebRTC-SDP: UmFyIRoHAM+QcwAADQAAAAAAADOUXQgkDoA9gIAA . . . .

Both of the WebRTC-SIP Interworking Functions 18 and 22 perform the same algorithm to encode and decode the SDP.

In a second example of implementing the X-WebRTC-SDP extension header (It can be used to Workflow 1 and Workflow 2), the WebRTC-SIP Interworking Function 18 embeds a SDP key in the extension header and saves the key value pair (for example SDP key and original SDP string) into an external database. The WebRTC-SIP Interworking Functions put and retrieve the SDP string from the same external database.

Figure 5:
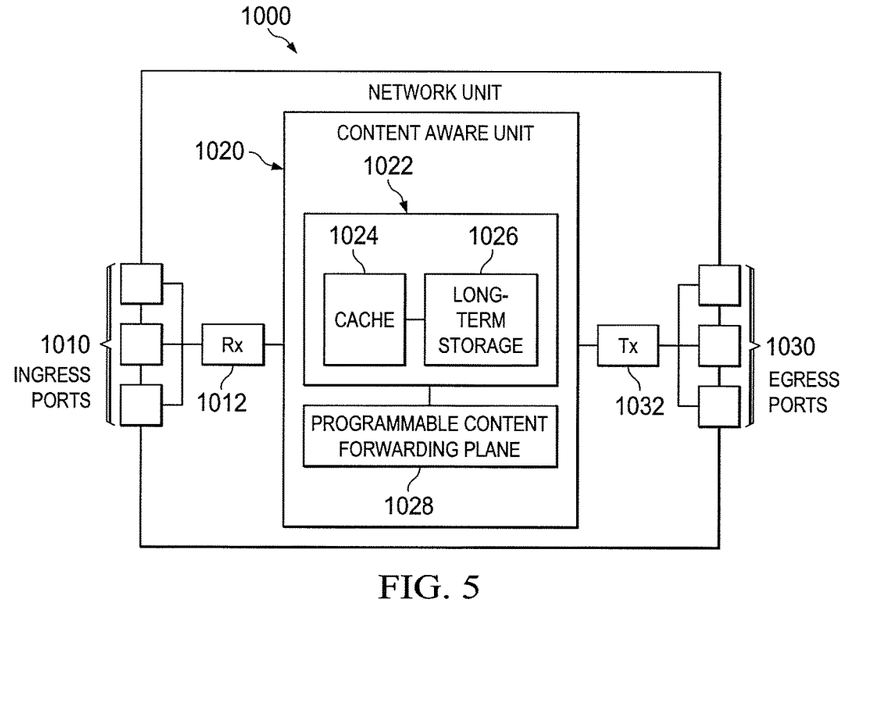
FIG. 5 illustrates an embodiment of a network unit.

FIG. 5 illustrates an embodiment of a network unit 1000, which may be any device that transports and processes data through network 100. For instance, the network unit 1000 may correspond to or may be located in any of the system nodes described above, such as the device or server described as above, for example, the WebRTC-SIP Interworking Function as described above, the web server, WebRTC client, IMS or SIP domain media server, Media Interworking Function, or SIP device, etc. The network unit 1000 may correspond to or may be located in any of the system nodes described above, such as a MN, AoS, content router R, and AS. The network unit 1000 may also be configured to implement or support the schemes and methods described above. The network unit 1000 may comprise one or more ingress ports or units 1010 coupled to a receiver (Rx) 1012 for receiving signals and frames/data from other network components. The network unit 1000 may comprise a content aware unit 1020 to determine which network components to send content to. The content aware unit 1020 may be implemented using hardware, software, or both. The network unit 1000 may also comprise one or more egress ports or units 1030 coupled to a transmitter (Tx) 1032 for transmitting signals and frames/data to the other network components. The receiver 1012, content aware unit 1020, and transmitter 1032 may also be configured to implement at least some of the disclosed schemes and methods above, which may be based on hardware, software, or both. The components of the network unit 1000 may be arranged as shown in FIG. 5.

The content aware unit 1020 may also comprise programmable content forwarding plane block 1028 and one or more storage blocks 1022 that may be coupled to the programmable content forwarding plane block 1028. The programmable content forwarding plane block 1028 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, and FIB) at the content aware unit 1020 or the network unit 1000. The programmable content forwarding plane block 1028 may interpret user requests for content and accordingly fetch content, e.g., based on meta-data and/or content name (prefix), from the network or other content routers and may store the content, e.g., temporarily, in the storage blocks 1022. The programmable content forwarding plane block 1028 may then forward the cached content to the user. The programmable content forwarding plane block 1028 may be implemented using software, hardware, or both and may operate above the IP layer or L2.

The storage blocks 1022 may comprise a cache 1024 for temporarily storing content, such as content that is requested by a subscriber. Additionally, the storage blocks 1022 may comprise a long-term storage 1026 for storing content relatively longer, such as content submitted by a publisher. For instance, the cache 1024 and the long-term storage 1026 may include Dynamic random-access memories (DRAMs), solid-state drives (SSDs), hard disks, or combinations thereof.

Figure 6:
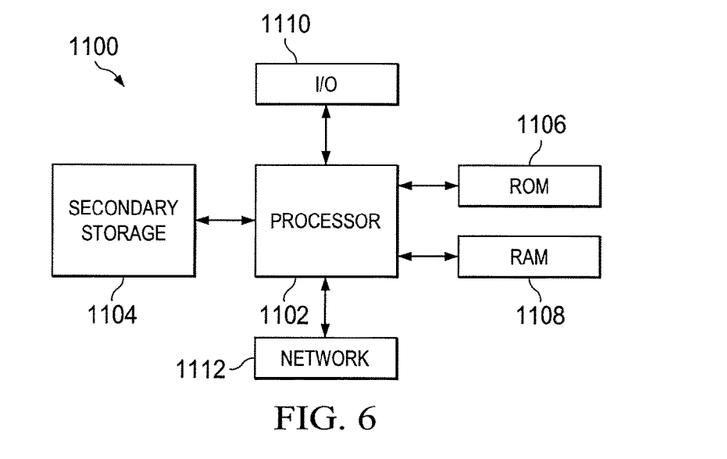
FIG. 6 illustrates a typical, general-purpose network component.

The network components described above may be implemented on any general-purpose network component, such as a computer or network component with sufficient processing power, memory resources, and network throughput capability to handle the necessary workload placed upon it. FIG. 6 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of establishing a communication between an originating WebRTC client and a receiving client in a network, the method comprising:
   receiving, by a Session Initiation Protocol (SIP) interworking function from the originating WebRTC client, an original caller Session Description Protocol (SDP) which supports a Secure Real-time Transport Protocol (SRTP) and an Interactive Connectivity Establishment (ICE);
   obtaining, by the SIP interworking function, local media information from a media interworking function;
   creating, by the SIP interworking function, a converted caller SDP which does not support the SRTP and the ICE based on the original caller SDP and the local media information from the media interworking function;
   creating a SIP message comprising the converted caller SDP and the original caller SDP, the converted caller SDP placed into a body of the SIP message, the original caller SDP placed into a SIP extension header of the SIP message, the original caller SDP, in the SIP extension header, not recognizable to other SIP devices in the communication network by virtue of the other SIP devices being unable to process an SDP extension header; and
   sending the SIP message to the receiving client via an IP Multimedia System (IMS) or SIP server, wherein the receiving client is a receiving WebRTC client or a receiving SIP device and the SIP message allows the originating WebRTC client to communicate peer-to-peer (P2P) with the receiving client.

2. The method as specified in claim 1, further comprising receiving a SIP response message, and obtaining a callee original SDP which supports the SRTP and the ICE, and sending a command to the media interworking function to release a resource in response to the receipt of the callee original SDP.

3. The method as specified in claim 2, further comprising sending the callee original SDP to the originating WebRTC client via a Web server, and wherein the callee original SDP is used for media negotiation and the P2P communication between the originating WebRTC client and the receiving WebRTC client.

4. The method as specified in claim 1, wherein the SIP extension header is an X-WebRTC-SDP extension header.

5. The method as specified in claim 1, wherein the original caller SDP comprises SDP information of the originating WebRTC client, and the method further comprises adding the original caller SDP into a message-body field of the SIP message.

6. The method as specified in claim 5, wherein the message-body field of the SIP message is multibody.

7. The method as specified in claim 4, wherein adding the original caller SDP into the X-WebRTC-SDP extension header of the SIP message comprises compressing an original SDP string by a compression algorithm and encoding the SDP string by base 64 encoding.

8. The method as specified in claim 4, wherein adding the original caller SDP into the X-WebRTC-SDP extension header of the SIP message comprises embedding a SDP key in the X-WebRTC-SDP extension header and saving a key value pair into an external database.

9. The method as specified in claim 8, wherein the key value pair comprises the SDP key and an original SDP string.

10. A network apparatus for establishing a communication between an originating WebRTC client and a receiving client in a communication network, the network apparatus comprising:
- a memory; and
- a processor coupled to the memory, wherein the memory includes instructions that when executed by the processor causes the network apparatus to perform the following:
  - receive, from an originating WebRTC client, an original caller Session Description Protocol (SDP) including a SDP information of the originating WebRTC client,
  - obtain local media information from a media interworking function, create a converted caller SDP based on the original caller SDP and the local media information from the media interworking function,
  - create a Session Initiation Protocol (SIP) message comprising the converted caller SDP and the original caller SDP, the converted caller SDP placed into a body of the SIP message, the original caller SDP placed into a SIP extension header of the SIP message, the original caller SDP, in the SIP extension header, not recognizable to other SIP devices in the communication network by virtue of the other SIP devices being unable to process an SDP extension header, and
  - send the SIP message to a receiving client via an IP Multimedia System (IMS) or SIP server, wherein the receiving client is a receiving WebRTC client or a receiving SIP device and the SIP message allows the originating WebRTC client to communicate peer-to-peer (P2P) with the receiving client;
- wherein the network apparatus implements a SIP interworking function.

11. The network apparatus as specified in claim 10 wherein the original caller SDP supports a Secure Real-time Transport Protocol (SRTP) and an Interactive Connectivity Establishment (ICE), and the converted caller SDP does not support the SRTP and the ICE.

12. The network apparatus as specified in claim 11, wherein the instructions executable by the processor are further configured to enable the network apparatus to receive a SIP response message from the receiving client via the IMS or the SIP server, obtain a callee original SDP of the receiving client from the SIP response message, send a command to the media interworking function to release a resource when recognizing that the callee original SDP supports the SRTP and the ICE.

13. The network apparatus as specified in claim 12, wherein the instructions executed by the processor are configured to further cause the network apparatus to send the callee original SDP to the originating WebRTC client via a Web server, and wherein the callee original SDP is configured to be used for media negotiation and the P2P communication between the originating WebRTC client and the receiving client.

14. The network apparatus as specified in claim 11, wherein the instructions executed by the processor are configured to further enable the network apparatus to receive a SIP response message from the receiving client via the IMS or the SIP server, obtain a callee original SDP of the receiving SIP device from a response SIP message, and send media information of the callee original SDP to the media interworking function when recognizing that the callee original SDP does not support the SRTP and the ICE.

15. The network apparatus as specified in claim 14, wherein the instructions executed by the processor are configured to further cause the network apparatus to create a converted callee SDP based on the callee original SDP and the local media information from the media interworking function when recognizing that the callee original SDP does not support the SRTP and the ICE.

16. The network apparatus as specified in claim 15, wherein the instructions executed by the processor are configured to further cause the network apparatus to send the converted callee SDP to the originating WebRTC client, and wherein the converted callee SDP is configured to be used for media negotiation between the originating WebRTC client and the media interworking function.

17. The network apparatus as specified in claim 10, wherein the SIP extension header is an X-WebRTC-SDP extension header.

18. The network apparatus as specified in claim 11, wherein the original caller SDP comprises SDP information of the originating WebRTC client, and the instructions are configured to be executed by the processor and further cause the network apparatus to add the original caller SDP into a message-body field of the a SIP message.

19. The network apparatus as specified in claim 18, wherein the message-body field of the SIP message is multibody.

20. The network apparatus as specified in claim 17, wherein the original caller SDP added into the X-WebRTC-SDP extension header of the SIP message comprises an original SDP string compressed by a compression algorithm and encoded by base 64 encoding.

21. The network apparatus as specified in claim 17, wherein the original caller SDP added into the X-WebRTC-SDP extension header of the SIP message comprises a SDP key embedded in the X-WebRTC-SDP extension header and configured to save a key value pair into an external database.

22. A communication system for establishing a communication in a WebRTC network, the communication system comprising:
- an originating Session Initiation Protocol (SIP) interworking network apparatus, an IP Multimedia System (IMS) or other SIP server, and a terminating SIP interworking network apparatus;
- wherein the originating SIP interworking network apparatus is configured to:
  - receive an original caller Session Description Protocol (SDP) including a SDP information from an originating WebRTC client;
  - obtain local media information from a media interworking function, create a converted caller SDP based on the original caller SDP and the local media information from the media interworking function;
  - create a SIP message comprising the converted caller SDP and the original caller SDP, the converted caller SDP placed into a body of the SIP message, the original caller SDP placed into a SIP extension header of the SIP message, the original caller SDP, in the SIP extension header, not recognizable to other SIP devices in the communication network by virtue of the other SIP devices being unable to process an SDP extension header;
  - when a destination is a receiving SIP device, send the SIP message to the IMS or other SIP server; and
  - when the destination is a receiving WebRTC client, send the SIP message to the terminating SIP interworking network apparatus;

wherein the terminating SIP interworking network apparatus is configured to:
  receive the SIP message, retrieve the original caller SDP, and send the original caller SDP to the receiving WebRTC client via a Web server; and
wherein the SIP message allows the originating WebRTC client to communicate peer-to-peer (P2P) with the receiving WebRTC client or the receiving SIP device.

23. The system as specified in claim 22, wherein the terminating SIP interworking network apparatus is further configured to receive the SIP message from an IP Multimedia System (IMS) or SIP server and detect and retrieve the original caller original SDP in a SIP extension header field of the SIP message.

24. The system as specified in claim 22, wherein the terminating SIP interworking network apparatus is further configured to receive the SIP message from an IP Multimedia System (IMS) or SIP server and detect and retrieve the original caller SDP in a message body field of the SIP message.

25. The system as specified in claim 22, wherein the terminating SIP interworking network apparatus is configured to not send any media information to an associated media interworking function in response to identifying that the originating WebRTC client and the receiving WebRTC client or the SIP device are capable of the P2P communication.

26. The system as specified in claim 24 wherein the terminating SIP interworking network apparatus is configured to receive a callee original SDP from the receiving WebRTC client, create a converted callee SDP with a hold state for the converted caller SDP to avoid media stream interruption detection in the IMS or the SIP Server, and embed the converted callee SDP into the message body field of the SIP response message and the callee original SDP in the SIP extension header of the SIP response message and send the SIP response message to the originating SIP interworking network apparatus via the IMS or the SIP Server.

27. The system as specified in claim 26, wherein the originating SIP interworking network apparatus is further configured to receive the SIP response message, and retrieve the callee original SDP from the SIP extension header field, send the callee original SDP to the originating WebRTC client via a Web server, and send a command to the media interworking function to release a resource.

28. The system as specified in claim 26, wherein the original caller SDP and callee original SDP support a Secure Real-time Transport Protocol (SRTP) and an Interactive Connectivity Establishment (ICE), and the converted caller SDP and the converted callee SDP do not support the SRTP and the ICE.

29. The method as specified in claim 1, wherein the originating WebRTC client comprises a WebRTC browser and the receiving client comprises a WebRTC browser.

30. The network apparatus as specified in claim 10, wherein the originating WebRTC client comprises a WebRTC browser and the receiving client comprises a WebRTC browser.

31. The system as specified in claim 22, wherein the originating WebRTC client comprises a WebRTC browser and the receiving WebRTC client comprises a WebRTC browser.

32. The method of claim 1, wherein the converted caller SDP is placed in an X-WebRTC-SDP field in the SIP extension header.

* * * * *

UNITED STATES PATENT AND TRADEMARK OFFICE
CERTIFICATE OF CORRECTION

PATENT NO. : 9,762,533 B2  
APPLICATION NO. : 14/137216  
DATED : September 12, 2017  
INVENTOR(S) : Ren et al.

Page 1 of 1

It is certified that error appears in the above-identified patent and that said Letters Patent is hereby corrected as shown below:

In the Specification

In Column 4, Line 54, delete "39," and insert --38,-- therefor

In Column 5, Line 30, delete "description(for" and insert --description (for-- therefor In Column 6, Line 52, after "comprise", insert --a--

Signed and Sealed this  
Twenty-eighth Day of May, 2019

Andrei Iancu  
*Director of the United States Patent and Trademark Office*